Oct. 5, 1965     H. T. THUNANDER     3,210,002

OVEN THERMOSTAT

Filed Oct. 31, 1963

INVENTOR
Hans T. Thunander
BY

United States Patent Office 3,210,002
Patented Oct. 5, 1965

3,210,002
OVEN THERMOSTAT
Hans T. Thunander, Mansfield, Ohio, assignor to Westinghouse Electric Corporation, Pittsburgh, Pa., a corporation of Pennsylvania
Filed Oct. 31, 1963, Ser. No. 320,417
4 Claims. (Cl. 236—15)

This invention relates to oven controls, and more particularly to a temperature responsive bulb for use with such controls.

A type of control commonly used in range ovens today makes use of a thermostat for cycling the oven heating elements in response to the temperature of the oven cavity. The thermostat generally employs an elongated bulb containing a thermally expansive fluid, which is connected through a capillary tube to a bellows or diaphragm located in the thermostat housing. The bulb is located within the oven enclosure, and responds to the oven temperature, causing the thermostat to cycle the heating elements on or off.

In ovens having an arrangement of the type described, there often exists a wide differential in oven temperature during operation of the unit, when the heating elements are cycling.

Three factors, which are known to contribute to the high differential condition, are; the temperature differential of the bulb itself, that is, the minimum temperature swing of the bulb to turn the element on and off; the time required to bring the heating element to a required temperature; and the delay in response of the tubular bulb.

The present invention is directed to the last mentioned factor and therefore has an object to decrease the response time of a thermostat control bulb thereby lessening the temperature differential of an oven.

Another object of the invention is to lessen the temperature differential of an oven due to cycling of the heating elements, without costly changes to the thermostat or heating elements by the provision of a control bulb having a novel shape.

A further object of the invention is to provide a new and improved temperature responsive bulb which may be easily and inexpensively manufactured.

In domestic range ovens, especially those employing electrical heating elements, it has been found that a larger portion of the heat flow from the heater element to the control bulb is by radiation. Many such range ovens have heater elements which radiate a considerable amount of energy before an appreciable amount of heat is transferred to the thermostat bulb by the air convection currents.

During the heating cycle of the oven described, the heat of radiation comes mainly from one direction, and the heater element may be regarded as a point source of radiant heat energy for the sake of analysis. The energy intercepted by the control bulb is then found to be proportional to the length and width of the intercepted ray bundle emanating from the heater, which is determined by the length and width of the control bulb.

However, when the power is off and the oven is cooling, the air surrounding the bulb is generally cooler than the bulb and cooling takes place by convection. In this instance, the larger the bulb surface area, the faster the cooling will take place by convection, thereby decreasing the response time of the control bulb.

Application of the above principles to the design of a temperature control bulb is complicated by two contributing factors. Any increase in volume of the control bulb causes an increase in heat capacity thereby producing a bulb that will both heat and cool at a slower rate. In addition, the bulb shape must be such that heat is readily transferred to and from the expanding fluid, and must be of a shape adequate to support the pressure of the fluid without elastic enlargement of the fluid containing cavity.

From the foregoing, it should be evident that the conventional thermostat control bulb of cylindrical shape does not provide a cross section which is optimum in reducing the response time of the thermostat. The cylindrical shape does not intercept much radiant energy in comparison to its heat capacity, and also has a rather small surface area for exchange of heat by convection during cooling. What is desired, therefore, is a sensing body shape which intercepts as much radiation as possible during heating of the oven, has a relatively large surface area for convection cooling during off cycles of the element, and has a small volume of heat capacity to provide both fast heat up and cool down.

The aforementioned objects, and other objects which will become apparent as the description proceeds, are achieved by providing a temperature responsive control bulb having a shape which approaches the optimum desired for use in the range oven environment.

The temperature responsive bulb of the present invention is provided with a tubular wall portion for containing a thermally expansive fluid, as is generally employed in such devices. In addition, the control bulb is provided with a fin member having a surface substantially unobscured from radiation normal to the member. The fin member is joined to the tubular wall in a manner to provide good heat transfer to the wall, and is relatively thin compared to the diameter of the tubular wall portion. The resultant structure is a control bulb having a maximum thickness in the direction normal to the fin member equal to the maximum diameter of the tubular wall portion of the member. The control bulb of the invention when properly placed in the presence of a heating element, is found to have a decrease in response time when compared with a finless tubular bulb having a tubular wall of equal dimensions. This improvement in response time is caused by the fin member transferring to the tubular wall both radiated and convected heat impinging on the thin surface, with the addition of a relatively small volume to the control bulb.

For a better understanding of the invention, reference should be had to the accompanying drawings wherein.

Although the principles of the invention are broadly applicable to a temperature responsive bulb for a thermostat, the invention has been herein illustrated as employed in a thermostatic control for an electric oven and will be so described.

Figure 1:
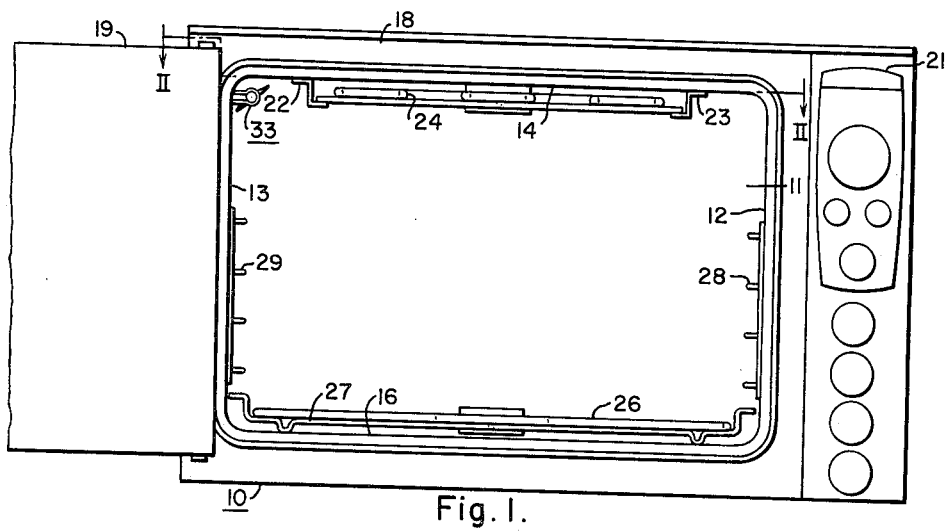
FIGURE 1 is a front elevational view of a domestic oven having the invention employed therein, the door being open to disclose features of the invention.

Referring to the drawings, especially FIG. 1, there is shown a domestic oven 10 having an enclosure 11 defined by side walls 12 and 13, upper wall 14, lower wall 16 and rear wall 17. The oven structure 10 also includes a front panel 18 which supports an oven door 19 which is movable from the position shown to a position closing the front opening of the enclosure 11. A cluster of control knobs designated by the numeral 21 is disposed adjacent a side of the front panel 18 and are operatively connected to the usual control elements for controlling the various functions of the oven 10.

Figures 2, 4, 5:
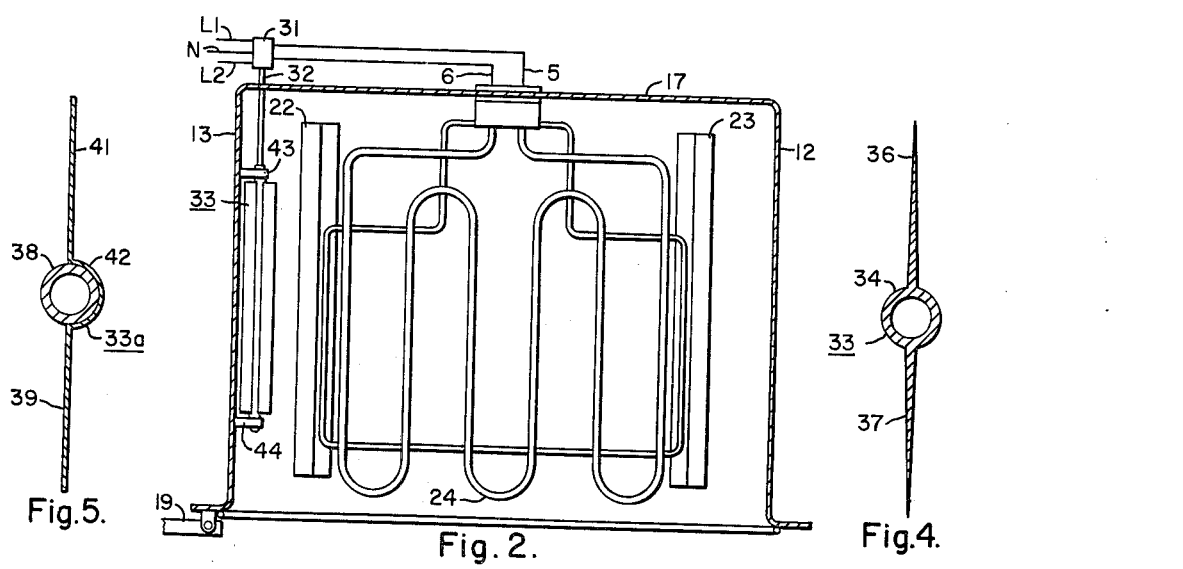
FIG. 2 is a section view taken along line II—II of FIG. 1 looking in the direction indicated by the arrows showing details of the oven interior.
FIG. 4 is a sectional view taken along line IV—IV of FIG. 3, showing a detailed cross-section of the control bulb.
FIG. 5 is a sectional view similar to FIG. 4, but showing a detailed cross-section of an alternate embodiment.

Disposed adjacent the upper wall 14 of the range oven 10, are a pair of Z members 22 and 23 for supporting a heating element 24, as best shown in FIG. 2. A lower heating element 26 is supported by a rack 27 which rests on the lower wall 16 of the enclosure 11. Oven rack supports 28 and 29 are disposed adjacent side walls 12 and 13, respectively, for supporting oven racks (not shown) in the usual manner.

Referring now to the schematic portion of FIG. 2, there is diagrammatically shown a thermostatic control 31 having power leads L1 and L2 which are connected to the 230 volt power line commonly used to supply power to domestic range units of this type. The power leads serve to provide electrical energy to the upper heating element 24 through the wires 5 and 6 (connected between the control 31 and the upper heating element) and to the lower heating element 26 through similar wires (not shown) connected between the control 31 and the lower heating element 26. During operation of the oven for baking, the lower heating element 24 operates on 230 volts at a higher temperature than the element 24 which receives 115 volts. A capillary tube 32 serves to connect the control 31 to a thermostatic control bulb 33 disposed in the oven enclosure 11. Both the thermostatic bulb 33 and the capillary tube 32 contain a thermally responsive fluid which acts through a bellows or diaphragm arrangement in the control 31 to cycle the power "on" or "off" in the circuit defined by wires 5 and 6.

The thermostatic control 31 is shown here schematically as it may be of any type which is well known in the art. Details of such a control device are not disclosed herein, as they form no part of the present invention.

Figure 3:
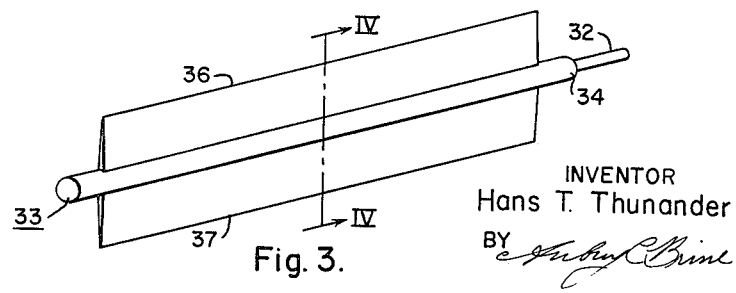
FIG. 3 is an enlarged perspective view of the control bulb.

Referring to the control bulb 33, it will be seen that the invention employs a novel configuration as best shown in FIGS. 3 and 4.

The control bulb 33 comprises a cylindrical wall 34 having a pair of diametrically opposed fin members 36 and 37 extending radially outwardly over the greater portion of the wall. The tubular wall 34 is closed at one end and at the opposite end is connected to the capillary tube 32 for admission of fluid to the bulb.

The fin members 36 and 37 are of a material having high heat conductivity, such as copper, and are disposed in direct heat conducting relation to the tubular wall 34. The members 36 and 37 may be joined to the bulb 34 by any method, such as brazing, by which a joint may be formed having heat conductivity approaching that of a unitary structure. However, to insure good heat conductivity, the tubular wall 34, fin 36, and fin 37, may be made from one piece of material by a method such as, for example, extrusion.

In FIG. 5, there is shown a second embodiment of a control bulb. This control bulb 33a has a cylindrical wall 38 and a single sheet of heat conductive material wrapped half way around the wall to form fin members 39 and 41 and semi-annular portion 42. Here, as in the previous embodiment, joining the fins 41 and 39 to the tubular wall 38 may be accomplished by any suitable method providing a joint between the tubular wall 38 and the semi-annular portion 42 which results in heat conductivity approaching that of a unitary structure.

In installing the control bulb 33 or 33a in the oven enclosure 11, a pair of spring clips 43 and 44 are pressed around the portions of the tubular wall 34 from which the fins 36 and 37 have been omitted, and the spring clips are mounted adjacent the side wall 13. As is best shown in FIG. 1, the control bulb 33 is positioned in the oven enclosure 11 with surfaces of the fin members 36 and 37 oriented so that a line normal to the fins points in the direction of maximum radiant heat flow thereto. With the bulb positioned as shown, both radiated and convected heat energy impinging on the fin members 36 and 37 is transferred to the tubular wall 34, and to the thermally responsive fluid contained therein.

The thermostatic control bulb 33 or 33a provided by the invention, is thus found to be superior to the common tubular shape control bulb when heated primarily by radiation coming substantially from one direction. The control bulb 33 or 33a approaches the optimum control bulb for use in such an environment by having an average dimension in the direction of the radiation relatively small, and preserving a stiff cylindrical cavity for the expansive fluid, while providing relatively large areas for intercepting both radiated and convected heat energy.

It should, therefore, be evident that the invention provides a control bulb which has a decrease in response time to both convected and radiated heat.

Further, by decreasing the response time of a thermostatic control bulb, the invention lessens the temperature differential in the oven caused by cycling of the heating elements.

While the invention has been shown in but two forms, it will be obvious to those skilled in the art that it is not so limited, but is susceptible of various additional changes and modifications without departing from the spirit thereof.

What is claimed is:

1. In an oven enclosure the combination of
   an element for providing heat to said oven enclosure, and
   a fluid containing temperature control bulb for controlling the operation of said element,
   said control bulb comprising a tubular wall closed at one end and having
   a conduit for the flow of fluid at the opposite end, and
   a fin member extending radially outwardly from said tubular wall and disposed in direct heat conducting relation thereon,
   said control bulb being so disposed in relation to said element that said fin member lies in a plane generally normal to direct radiation from said element,
   whereby said fin member is effective to reduce response time of the control bulb to both radiated and convected heat from said element.

2. An oven device comprising wall structure defining an oven enclosure,
   an element for providing heat to said oven enclosure,
   thermostatic means for controlling said heating element, including a
   fluid containing temperature responsive bulb operatively connected to said thermostatic means,
   said bulb comprising a tubular wall closed at one end for containing said fluid,
   a conduit for the flow of said fluid at the other end, and
   a fin member extending radially outwardly from said tubular wall and disposed in direct heat conducting relation thereon
   said temperature responsive bulb and said element being so related in said enclosure that said fin member lies in a plane generally normal to direct radiation from said element,
   said fin member thereby being effective to reduce response time of said bulb to both radiated and convected heat from said element.

3. An oven device comprising wall structure defining an oven enclosure,
   a radiant heating element for said enclosure,
   thermostatic means for controlling said heating element, including
   a fluid containing temperature responsive bulb operatively connected to said thermostatic means,
   said bulb comprising a cylindrical wall closed at one end for containing said fluid,
   a conduit for the flow of fluid at the opposite end, and
   a pair of diametrically opposed fin members extending radially outwardly from said tubular wall and disposed in direct heat conducting relation thereon, said temperature responsive bulb and said element being disposed in said enclosure in a manner whereby said fin members lie in a plane generally normal to direct radiation from said element, said fin members thereby being effective to reduce the response time of said bulb to both radiation and convected heat from said element.

4. The oven device of claim 3 further characterized by said temperature responsive bulb having a maximum thickness in a direction normal to said fin members equal to the maximum diameter of said cylindrical wall.

References Cited by the Examiner
UNITED STATES PATENTS

| | | | |
|---|---|---|---|
| 767,187 | 8/04 | Wadham | 165—183 X |
| 1,990,219 | 2/35 | Baird. | |
| 2,152,934 | 4/39 | Trent. | |
| 2,277,921 | 3/42 | McCullough et al. | 165—183 X |
| 2,288,788 | 7/42 | Clark et al. | 148—6.24 |

FOREIGN PATENTS

| | | |
|---|---|---|
| 403,899 | 1/34 | Great Britain. |
| 883,346 | 11/61 | Great Britain. |

WILLIAM F. O'DEA, *Primary Examiner.*

ALDEN D. STEWART, EDWARD J. MICHAEL, *Examiners.*